US008560676B2

(12) United States Patent
Mori

(10) Patent No.: US 8,560,676 B2
(45) Date of Patent: Oct. 15, 2013

(54) COMMUNICATION SYSTEM, COMMUNICATION METHOD, INFORMATION RECORDING MEDIUM, AND PROGRAM

(75) Inventor: Shoji Mori, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 570 days.

(21) Appl. No.: 12/867,744

(22) PCT Filed: Feb. 12, 2009

(86) PCT No.: PCT/JP2009/052283
§ 371 (c)(1),
(2), (4) Date: Aug. 13, 2010

(87) PCT Pub. No.: WO2009/101962
PCT Pub. Date: Aug. 20, 2009

(65) Prior Publication Data
US 2010/0312889 A1 Dec. 9, 2010

(30) Foreign Application Priority Data

Feb. 15, 2008 (JP) ................................. 2008-034497

(51) Int. Cl.
*G06F 15/173* (2006.01)
(52) U.S. Cl.
USPC ........... 709/224; 709/206; 370/392; 370/248; 713/150
(58) Field of Classification Search
USPC ........... 709/206, 224; 370/392, 248; 713/150
See application file for complete search history.

(56) References Cited

U.S. PATENT DOCUMENTS

| | | | | |
|---|---|---|---|---|
| 5,548,578 | A * | 8/1996 | Matsune et al. | 370/248 |
| 2003/0093664 | A1* | 5/2003 | Miyoshi et al. | 713/150 |
| 2008/0019367 | A1* | 1/2008 | Ito et al. | 370/392 |

FOREIGN PATENT DOCUMENTS

| | | |
|---|---|---|
| JP | 10-107795 A | 4/1998 |
| JP | 2001-034553 A | 2/2001 |
| JP | 2004-222805 A | 8/2004 |
| JP | 2005-130166 A | 5/2005 |
| JP | 2006-212288 A | 8/2006 |
| WO | WO 00/39688 A1 | 7/2000 |
| WO | WO 2007/094215 A1 | 8/2007 |

OTHER PUBLICATIONS

International Search Report and English Translation for PCT Patent Application No. PCT/JP2009/052283, mailed on May 19, 2009, 5 pages.

* cited by examiner

*Primary Examiner* — Kyung H Shin
(74) *Attorney, Agent, or Firm* — Howard & Howard Attorneys PLLC

(57) ABSTRACT

In order to detect a fraudulent action, such as an attempt of invalidating a result of a match-up through a communication in a communication match-up game by changing the setting of a router device, in a communication system, a first terminal device and a second terminal device each attempts to communicate with the terminal device of a communication counterparty. When such attempt has failed, those terminal devices each attempts to communicate with a router device used by the local terminal device of the communication counterparty, and results of these communication attempts are specified in connection information status and the connection information status is transmitted to a server device. The server device receives the connection information status, and checks a communication status between the first terminal device and the second terminal device, between the second terminal device and a first router device which is connected to the first terminal device, and a communication status between the first terminal device and a second router device which is connected to the second terminal device, and determines, based on the fact that communicable routes are asymmetric, the presence/absence of a fraudulent action by a user using the terminal device.

6 Claims, 6 Drawing Sheets

COMMUNICATION SYSTEM, COMMUNICATION METHOD, INFORMATION RECORDING MEDIUM, AND PROGRAM

TECHNICAL FIELD

The present invention relates to a communication system and a communication method suitable for detecting fraudulent attempts of router device usage, in communication match-up games, to invalidate the results of a communication match-up game by changing the router device setting, a computer-readable information recording medium recording a program which realizes those system and method on a computer and the program.

BACKGROUND ART

Currently, conventional communication systems for network match-up games, which enable a communication match-up over the Internet have been proposed. In such communication systems, a terminal device used by a user first connects to a server device called a lobby server and is subsequently introduced to a match-up counterparty. After the match-up counterparty is set, terminal devices establish peer-to-peer communication to conduct a communication match-up game, and when the winner and the loser are determined, the match-up result is sent to the server device. Moreover, from the standpoint of popularization of an in-home LAN (Local Area Network) and of a network security, the terminal device generally connects to the Internet through a router device, a firewall, etc.

In such communication systems for a communication match-up game, when a player is not satisfied with a match-up result, the player may perform a malicious action such as, for example, the player changing the setting of the router device or the firewall connected to the terminal device used by the user, or disconnecting the connection thereto in order to sabotage the communication link with the counterparty, thereby invalidating the match-up result itself Such action is called a "cheating action".

A technology of detecting such a cheating action is disclosed in patent literature to be discussed later.

Because it is difficult for a player to rewrite the program of a game in some cases, the player may carry out a cheating action by disconnecting a wire connection to the router device or by turning off the power of the router device to disable a connection to the Internet. Patent Literature 1 specifies where the cause of a communication failure is present in a terminal device performing a match-up and how to cope with such action.

That is, each terminal attempts to establish communication with other communication devices like a lobby server when a communication fails while a terminal device is conducting a match-up with the terminal of a match-up counterparty. When succeeding in such an attempt, the terminal device determines that the terminal device of the match-up counterparty had some type of failure, and when failing such attempt, the terminal device determines that the failure occurred between the local terminal device and a computer communication network. According to such technology, the presence/absence of such a failure can be a criterion for determining whether cheating by a user has occurred.

Patent Literature 1: Unexamined Japanese Patent Application KOKAI Publication No. 2005-130166

DISCLOSURE OF INVENTION

Problem to be Solved by the Invention

However, there are cheating techniques that cannot be detected by conventional technologies like Patent Literature 1, e.g., a technique of temporarily changing the filtering rule of the router device to reject only a communication from the match-up counterparty. Accordingly, it is necessary to detect such various cheating actions by new technology. Moreover, there is also a demand to help users who suffer from cheating actions by executing a process that cancels that action even if the cheating action is caused by disconnecting a communication through the foregoing techniques.

The present invention overcomes the foregoing problem, and it is an object of the present invention to provide a communication system and a communication method suitable for detecting a fraudulent action such that a user using a router device attempts, in a match-up game through a communication, to invalidate a result of a communication match-up by changing the setting of the router device, a computer-readable information recording medium recording a program which realizes those system and method on a computer, and the program.

Means for Solving the Problem

To achieve the foregoing object, the following present invention will be disclosed in accordance with the principle thereof.

A communication system according to a first aspect of the present invention comprises a first terminal device which is connected to a computer communication network through a first router device, a second terminal device which is connected to the computer communication network through a second router device, and a server device which is connected to the computer communication network, and the first terminal device and the second terminal device communicate with each other as respective communication counterparties through the first router device, the computer communication network, and the second router device, and is configured as follows.

That is, the first terminal device and the second terminal device each includes a counterparty communication unit, a router-identifier acquiring unit, a router communication unit, and a status transmitting unit.

The counterparty communication unit communicates with the communication counterparty through the router device to which the local terminal device is connected. The counterparty communication unit typically bears a communication process for realizing a player-to-player match-up in a match-up game through a network communication.

Conversely, the router-identifier acquiring unit acquires a communication identifier of the router device to which the communication counterparty is connected when a communication from the counterparty communication unit to the local communication counterparty succeeds. In this case, the communication identifier typically means an IP address and a port number. In general, when a packet transmitted from the communication counterparty is received, routing history information is maintained within the packet. The router device of the communication counterparty can be derived from this information.

Moreover, when the communication counterparty is introduced through a lobby server, an IP address associated with the introduction corresponds to the IP address itself of the router device of the communication counterparty. In this case, as long as a communication with the communication counterparty is realized, the introduced IP address itself is a communication identifier of the router device, and a set of the introduced IP address and a port number corresponds to a communication identifier of the terminal device of the communication counterparty.

Furthermore, when a communication from the counterparty communication unit to the communication counterparty succeeds but then fails, the router communication unit communicates with the route device having the acquired communication identifier.

As explained above, it is typical that communication with the communication counterparty is carried out on the basis of a predetermined protocol for a communication match-up using an IP address and a port number. When the communication match-up falls through because of, for example, a communication time out, the router communication unit determines whether a communication with the router device is possible.

As explained above, when the communication identifier of the router device to which the local communication counterparty is connected is the IP address, it becomes possible to check whether communication with the router device is possible by transmitting packets based on, for example, a PING protocol to the router device to check a response from that router device.

Moreover, the status transmitting unit transmits, at a predetermined timing, connection status information to the server device specifying whether communication from the counterparty communication unit to the communication counterparty is successful and whether communication from the router communication unit to the router device to which the communication counterparty is connected is successful.

When communication with the communication counterparty is successful, communication with the router device of the communication counterparty is deservingly successful, so that indication of whether communication through the router communication unit is successful in the connection status information may be limited only in a case in which the communication with the communication counterparty has failed. Note that typical examples of the predetermined timing are at regular time intervals, when the communication with the communication counterparty has failed, when a match-up with the communication counterparty ends and a match-up result is to be informed, or a combination of these.

Conversely, the server device includes a status receiving unit and a fraudulence determining unit.

The status receiving unit receives the connection status information transmitted from the first terminal device, and the connection status information transmitted from the second terminal device. As explained above, the connection status information is transmitted at a predetermined timing, and it is typical that the status receiving unit stores the latest connection status information received from both terminal devices in a RAM (Random Access Memory) or the like.

Conversely, the fraudulence determining unit determines, based on the connection status information received from the first terminal device and the connection status information received from the second terminal device, (1) that a user of the first terminal device takes a fraudulent action when it is specified that a communication from the first terminal device to the second terminal device is successful, a communication from the second terminal device to the first terminal device has failed, and a communication from the second terminal device to the first router device is successful, and (2) that a user of the second terminal device takes a fraudulent action when it is specified that a communication from the second terminal device to the first terminal device is successful, a communication from the first terminal device to the second terminal device has failed, and a communication from the first terminal device to the second router device is successful.

In a case in which the connection status information from both terminal devices have arrived at the server device, it can be expected that there is no mechanical disturbance (e.g., a cable is detached, power is turned off) among the first terminal device, the first router device, and the Internet, and among the second terminal device, the second router device, and the Internet.

Accordingly, in the above-explained determination (1), it is determined whether a failure is present in the inflow of packets from the second terminal device with the first router device being as a boundary, and in the above-explained determination (2), it is determined whether a failure is present in the inflow of packets from the first terminal device with the second router device being as a boundary.

In the present invention, a typical example assumed as a fraudulent action taken by the users of both terminals is a cheating action such as "the user making a match-up impossible by temporarily adopting filtering rules, such as rejecting the inflow of packets from the terminal device of the communication counterparty, thereby invalidating a match-up result when the match-up through a communication is considered to be disadvantageous for that user".

Even if such fraudulent action cannot always be determined through the technique disclosed in Patent Literature 1, it is possible to determine, based on the conditions (1) and (2), the presence/absence of such fraudulent action by causing the server device to intervene between terminal devices. Note that the present invention can be used in combination with the technology disclosed in Patent Literature 1.

According to the present invention, it becomes possible to detect, as much as possible, a fraudulent action, such as, for example, a user using router device attempts to invalidate a result of a match-up through a communication in a communication match-up game by changing the setting of the router device.

Moreover, in the communication system of the present invention, the fraudulence determining unit can be configured as follows:

(3) to determine that the user of the first terminal device takes a fraudulent action when the connection status information to be transmitted from the first terminal device is not received for a predetermined period, and the connection status information to be transmitted from the second terminal device is received during the predetermined period.

(4) to determine that the user of the second terminal device takes a fraudulent action when the connection status information to be transmitted from the second terminal device is not received for the predetermined period, and the connection status information to be transmitted from the first terminal device is received during the predetermined period.

The present invention is in accordance with the foregoing preferred embodiment of the present invention, and a typical example assumed as a fraudulent action taken by the users in the foregoing determinations (3) and (4) is a cheating action such that "the user makes a communication of the local terminal device impossible so as to make a match-up impossible, thereby invalidating a match-up result when the match-up through a communication is considered to be disadvantageous for that user".

According to the present invention, it becomes possible to detect, as much as possible, a fraudulent action such that a user using a router device attempts to invalidate a result of a match-up through a communication in a communication match-up game by changing the setting of the router device, by turning off the power, or by disconnecting a connection.

Moreover, the communication system of the present invention can be configured as follows.

That is, at the first terminal device and at the second terminal device, when a communication with the communication counterparty through the counterparty communication unit has failed, and a communication with the router device to which the communication counterparty is connected through the router communication unit is successful, the status transmitting unit specifies and transmits the connection status information to the server device. The connection status information to the server device may indicate that communication with the communication counterparty through the counterparty communication unit has failed and the communication with the router device to which the communication counterparty is connected through the router communication unit was successful, additionally, the transmission information that the counterparty communication unit has failed to transmit to the communication counterparty.

That is, two pieces of information below are specified in the connection status information:

(1) Information indicating that communication with the communication counterparty through the counterparty communication unit has failed and that communication with the router device to which the communication counterparty is connected through the router communication unit is successful.

(2) The transmission information that the counterparty communication unit failed to transmit to the communication counterparty. That is, contents of packets that the counterparty communication unit attempted to transmit to the communication counterparty, but failed to transmit.

Those pieces of information are embedded in the connection status information and transmitted to the server device.

Conversely, the server device further includes an information relaying unit. The information relaying unit transmits the transmission information specified in the connection status information from the second terminal device to the first terminal device when condition (1) is satisfied, transmits the transmission information specified in the connection status information from the first terminal device to the second terminal device when condition (2) is satisfied, and relays the transmission information.

That is, contents of packets failed to be transmitted to the terminal device determined as taking a fraudulent action are transmitted from the server device.

Moreover, the first terminal device and the second terminal device each include an information receiving unit. The information receiving unit receives the transmission information transmitted from the server device, and the counterparty communication unit treats the transmission information received by the information receiving unit as being communicated from the communication counterparty.

When for any reason packets to be transmitted from the communication counterparty do not arrive (typically, due to cheating), and are relayed through the server device and received, a match-up is continued based on that transmission information.

According to the present invention, even if the above-explained cheating action is taken, a communication match-up is continued through the server device while the fraudulent action by a person who is taking such cheating action can be detected, so the intended victim of the cheating action can continue the game as if no cheating was attempted.

A communication method according to another aspect of the present invention is executed by a first terminal device which is connected to a computer communication network through a first router device, a second terminal device which is connected to the computer communication network through a second router device, and a server device which is connected to the computer communication network, and the first terminal device and the second terminal device communicate with each other as respective communication counterparties through the first router device, the computer communication network, and the second router device. The first terminal device and the second terminal device each includes a counterparty communication unit, a router-identifier acquiring unit, a router communication unit, and a status transmitting unit, and the server device includes a status receiving unit, and a fraudulence determining unit. The communication method comprises a counterparty communication step, a router-identifier acquisition step, a router communication step, a status transmission step, a status reception step, and a fraudulence determination step, and is configured as follows.

That is, at the first terminal device, and at the second terminal device, in the counterparty communication step, the counterparty communication unit communicates with the communication counterparty through the router device to which the local terminal device is connected, in the router-identifier acquisition step, the router-identifier acquiring unit acquires a communication identifier of the router device to which the communication counterparty is connected when a communication to the communication counterparty succeeds in the counterparty communication step, in the router communication step, the router communication unit communicates with the router device having the acquired communication identifier when a communication to the communication counterparty succeeds but then failed in the counterparty communication step, and in the status transmission step, connection status information specifying whether communication to the communication counterparty is successful in the counterparty communication step and whether communication to the router device to which the communication counterparty is connected is successful in the router communication step is transmitted to the server device at a predetermined timing.

Conversely, at the server device, in the status reception step, the status receiving unit receives the connection status information transmitted from the first terminal device and the connection status information transmitted from the second terminal device, and in the fraudulence determination step, the fraudulence determining unit determines, based on the connection status information received from the first terminal device and the connection status information received from the second terminal device, (1) that a user of the first terminal device takes a fraudulent action when it is specified that a communication from the first terminal device to the second terminal device is successful, a communication from the second terminal device to the first terminal device has failed, and a communication from the second terminal device to the first router device is successful, and (2) that a user of the second terminal device takes a fraudulent action when it is specified that a communication from the second terminal device to the first terminal device is successful, a communication from the first terminal device to the second terminal device has failed, and a communication from the first terminal device to the second router device is successful.

A program according to the other aspect of the present invention is configured to include a terminal program which causes a first terminal computer to function as the first terminal device of the foregoing communication system, and causes a second terminal computer to function as the second terminal device of the foregoing communication system, and a server program which causes a server computer to function as the server device of the foregoing communication system.

Moreover, the program of the present invention can be recorded in a computer-readable information memory medium, such as a compact disk, a flexible disk, a hard disk, a magneto-optical disk, a digital video disk, a magnetic tape, or a semiconductor memory.

The program can be distributed and sold over a computer communication network independently from a computer which runs the program. Moreover, the information memory medium can be distributed and sold independently from that computer.

Effect of the Invention

According to the present invention, it is possible to provide a communication system and a communication method suitable for detecting fraudulent action, such as, for example, a user using router device attempts, in a match-up game through a communication, to invalidate a result of a communication match-up by changing the setting of the router device, a computer-readable information recording medium recording a program which realizes those system and method on a computer, and the program.

DESCRIPTION OF REFERENCE NUMERALS

Figure 1:
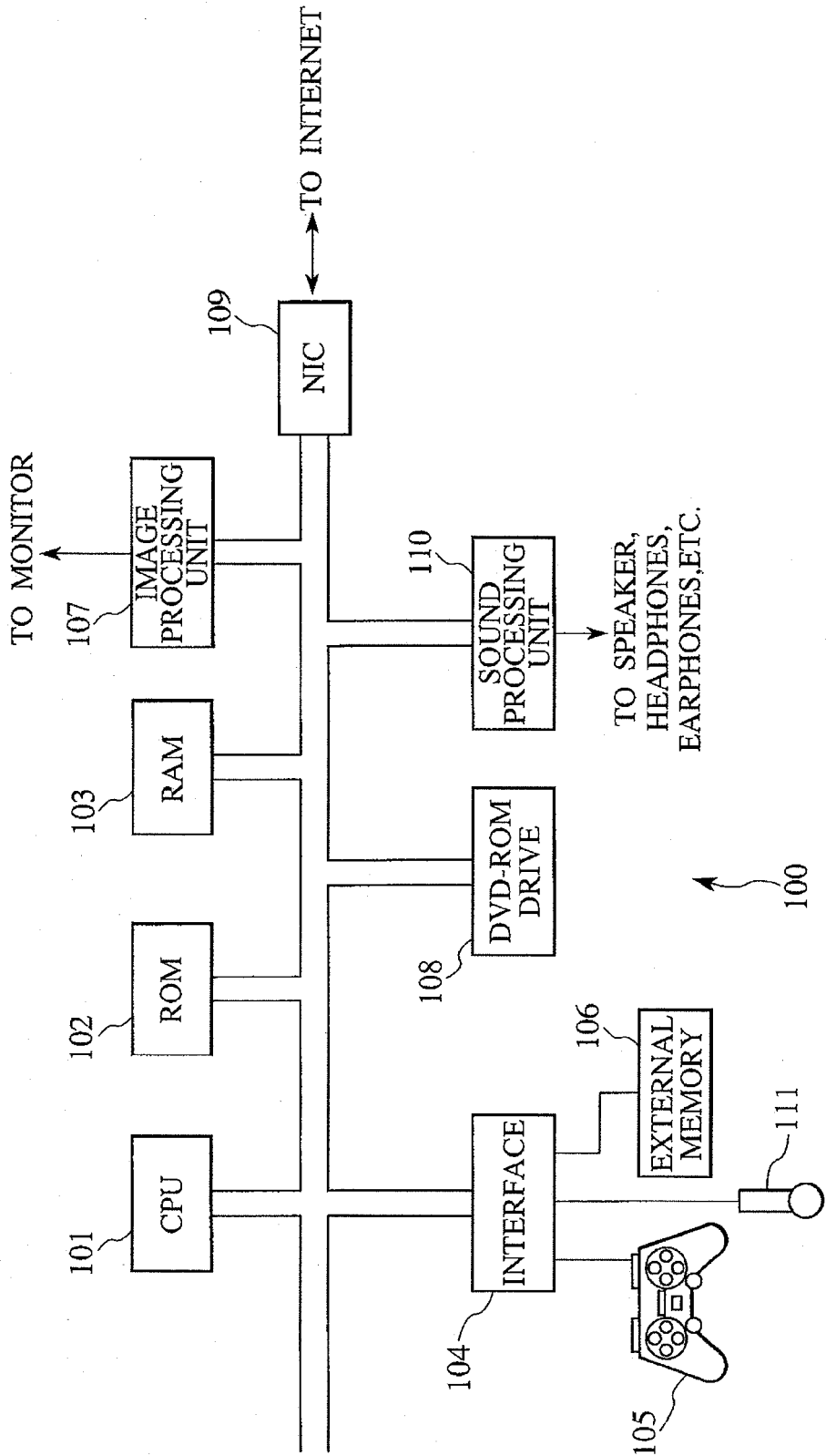
FIG. 1 is an illustrative diagram showing a general configuration of a typical information processing device.

100 Information processing device
101 CPU
102 ROM
103 RAM
104 Interface
105 Controller
106 External memory
107 Image processing unit
108 DVD-ROM drive
109 NIC
110 Sound processing unit
111 Microphone
201 Communication system
211 First terminal device
212 First router device
221 Second terminal device
222 Second router device
231 Server device
241 Internet
501 Terminal device
502 Counterparty communication unit
503 Router-identifier acquiring unit
504 Router communication unit
505 Status transmitting unit
506 Information receiving unit
701 Status receiving unit
702 Fraudulence determining unit
703 Information relaying unit

BEST MODE FOR CARRYING OUT THE INVENTION

An explanation will be given of an embodiment of the present invention. For ease of understanding, the embodiment that uses an information processing device for games to realize the present invention will be explained. However, the embodiment described below is provided to give explanations, not to limit the scope of the present invention. Consequently, those skilled in the art can adopt embodiments in which some of or all of the structural elements are replaced with respective equivalents, and it should be understood that such embodiments are also included within the scope of the present invention.

<First Embodiment>

A communication system according to the present embodiment is realized as a server computer connected to a computer communication network, such as, for example, the Internet is caused to run a predetermined program to function as a server device, and is set to be communicable with a terminal device, such as a cellular phone or a portable game device.

The terminal device and the server device have a common in a basic operation principle and a configuration although those devices have a difference in processing ability or the like. Therefore, an explanation below will be given of a general configuration of an information processing device at first, and a difference between cases in which the information processing device is applied as the terminal device and in which the information processing device is applied as the server device will be explained as needed in accordance with such difference.

FIG. 1 is an illustrative diagram showing a general configuration of a typical information processing device which can function as the server device or the terminal device of the present embodiment by running a program. The explanation will be given with reference to this diagram.

An information processing device 100 can be comprised of a CPU (Central Processing Unit) 101, a ROM 102, a RAM (Random Access Memory) 103, an interface 104, a controller 105, an external memory 106, an image processing unit 107, a DVD-ROM (Digital Versatile Disc ROM) drive 108, an NIC (Network Interface Card) 109, a sound processing unit 110, and a microphone 111. Various input/output devices can be omitted accordingly.

As a DVD-ROM storing a program and data for games is loaded in the DVD-ROM drive 108 and the information processing device 100 is powered on, the program is run and the server device of the present embodiment is realized.

Moreover, the portable game device can use a ROM cassette slot instead of using the DVD-ROM drive 108 so as to be portable. In this case, as a ROM cassette recording the program is inserted and the program is run, the terminal device of the present embodiment is realized.

Moreover, the NIC 109 is a wireless LAN card in a condition in which an in-home wireless LAN is set. Conversely, in the server device, it is typical that the NIC 109 connects to the Internet as a wired LAN card. An access point device accessed by a wireless LAN card of the terminal device is connected to the Internet using its own router function or through other router devices, thereby enabling a communication between the terminal device and the server device.

The CPU 101 controls the entire operation of the information processing device 100, and is connected to each structural element to exchange control signals and data therewith. Moreover, the CPU 101 can perform arithmetic calculations, such as addition, subtraction, multiplication and division, logical operations, such as logical addition, logical multiplication, and logical negation, and bit operations, such as bitwise OR, bitwise AND, bit inversion, bit shift, and bit rotation, using an ALU (Arithmetic Logic Unit) (not illustrated) to a register (not illustrated) which is a memory area that can be accessed at a high speed. Furthermore, the CPU 101 may by itself be configured to perform, at a high speed, saturate calculations, such as addition, subtraction, multiplication and division, vector operations like trigonometric functions, to cope with multimedia processing, or may realize these operations with a coprocessor.

An IPL (Initial Program Loader) which is executed immediately after the power is turned on is recorded in the ROM 102, and as executed, causes a program recorded in the DVD-ROM to be read into the RAM 103 and executed by the CPU 101. An operating system program and various data necessary for controlling the operation of the whole information processing device 100 are stored in the ROM 102.

The RAM 103 is a temporally memory for storing data and programs, and retains programs and data which are read out from the DVD-ROM, and other data necessary for game proceeding and chat communications. Moreover, the CPU 101 has a variable area in the RAM 103, and performs such processes as performing operations by directly working the ALU on the value stored as the variable, or once storing the value stored in the RAM 103 in the register to perform calculations on the register and writing back the calculation result in the memory.

The controller 105 connected via the interface 104 receives an operation input given by a user for executing a game.

The external memory 106 detachably connected via the interface 104 rewritably stores data representing a play status (e.g., past game achievements) of the game or the like, data representing the progress status of the game, and log (record) data of a chat communication in the case of a network match-up game. As needed, the user can record such data in the external memory 106 by giving an instruction input via the controller 105.

The DVD-ROM to be loaded in the DVD-ROM drive 108 records a program for realizing a game, and image data and sound data accompanying the game. Under the control of the CPU 101, the DVD-ROM drive 108 performs a read-out process on the DVD-ROM loaded therein to read out a necessary program and data, which are to be temporarily stored in the RAM 103 or the like.

The image processing unit 107 processes data read out from the DVD-ROM by means of the CPU 101 and an image computation processor (not illustrated) of the image processing unit 107, and records such processed data in a frame memory (not illustrated) of the image processing unit 107. Image information recorded in the frame memory is converted into video signals at predetermined synchronization timings, and output to a monitor (not illustrated) connected to the image processing unit 107. This enables various types of image display.

The image computation processor can perform, at a high speed, overlay calculations of two-dimensional images, transparency calculation like a blending, and various saturate calculations.

Moreover, the image computation processor can also perform, at a high speed, rendering of polygon information arranged in a virtual three-dimensional space and affixed with various texture information by Z-buffering to obtain a rendered image of the polygon arranged in the virtual three-dimensional space as viewed panoramically from a predetermined view position toward a predetermined direction of a visual line.

Furthermore, the CPU 101 and the image computation processor can work together to depict letter strings as a two-dimensional image in the frame memory or on each surface of a polygon in accordance with font information which defines the shape of a letter.

The NIC 109 connects the information processing device 100 to a computer communication network (not illustrated) like the Internet. The NIC 109 is configured by a 10BASE-T/100BASE-T compatible product used for establishing a LAN, an analog modem, an ISDN (Integrated Services Digital Network) modem or an ADSL (Asymmetric Digital Subscriber Line) modem for connecting to the Internet via a telephone line, a cable modem for connecting to the Internet via a cable television line or the like, and an interface (not illustrated) which intermediates between any of those and the CPU 101.

The sound processing unit 110 converts sound data read out from the DVD-ROM into an analog sound signal, and outputs it from a speaker (not illustrated) connected thereto. Moreover, under the control of the CPU 101, the sound processing unit 110 generates a sound effect or music data to be output in the progress of the game, and outputs sounds corresponding to such data from the speaker, headphones (not illustrated), or earphones (not illustrated).

When sound data recorded in the DVD-ROM is MIDI data, the sound processing unit 110 refers to sound source data held by the MIDI data to convert the MIDI data into PCM data. Moreover, when sound data is compressed sound data in an ADPCM format, an Ogg Vorbis format or the like, the sound processing unit 110 extracts the data and converts it into PCM data. The sound processing unit 110 performs a D/A (Digital/Analog) conversion on the PCM data at a timing corresponding to the sampling frequency of that data and outputs it to the speaker, thereby enabling sound output.

Furthermore, the microphone 111 can be connected to the information processing device 100 via the interface 104. In this case, an A/D conversion is performed on an analog signal from the microphone 111 at an appropriate sampling frequency, and is converted into a digital signal in the PCM format which is processable by the sound processing unit 110 like a mixing.

Moreover, the information processing device 100 may use a large-capacity external memory device like a hard disk drive which is configured to function as the ROM 102, the RAM 103, the external memory 106, the DVD-ROM loaded in the DVD-ROM drive 108, etc.

Furthermore, a configuration that a keyboard for receiving an editing input of letter strings given by the user and a mouse for receiving inputs of specifying and selecting various positions are connected may be adopted. Moreover, a generalpurpose personal computer may be also used instead of the information processing device 100 of the present embodiment.

As explained above, although the server device and the terminal device are realized as the information processing device 100 runs the program, those devices may be also realized on a general computer. This is because there is no large difference in configuration and in function between the information processing device 100 and the general computer. As explained above, in this application, the general computer and the information processing device 100 are both commonly explained.

For example, like the information processing device 100 corresponding to a so-called consumer game device, the general computer comprises a CPU, a RAM, a ROM, a DVD-ROM drive and an NIC, and has an image processing unit having a simpler function than that of the image processing device 100. The general computer also has a hard disk drive as an external memory device, and can use a flexible disk, a magneto-optical disk, a magnetic tape, etc. Moreover, a keyboard and a mouse are used as input devices instead of the controller 105.

Furthermore, as a cellular phone, a portable game machine and a karaoke device also have a function equivalent to that of the general computer, the present invention can be realized by using any of those various devices accordingly as a platform which realizes the terminal device and the server device.

<Communication System>

Figure 2:
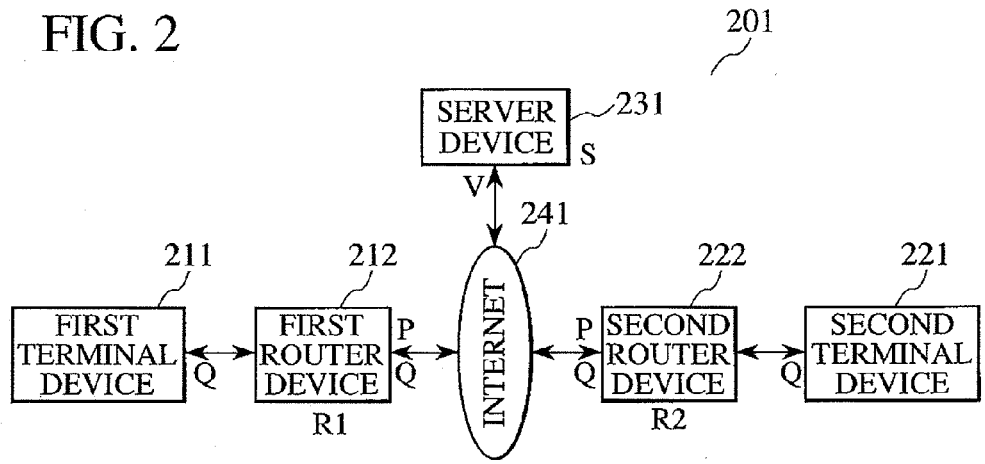
FIG. 2 is an explanatory diagram showing a general configuration of a communication system according to an embodiment.

FIG. 2 is an explanatory diagram showing a general configuration of the communication system according to the present embodiment. An explanation will now be given with reference to this diagram.

A communication system 201 comprises a first terminal device 211, a second terminal device 221, and a server device 231 which are communicable with one another through the Internet 241.

The first terminal device 211 is connected to the Internet 241 through a first router device 212, and the second terminal device 221 is connected to the Internet 241 through a second router device 222.

The first router device 212 serves as a boundary between the Internet 241 and an in-home LAN where the first terminal device 211 is present, and functions as a gateway/firewall/address and port number converting device.

Moreover, the second router device 222 servers as a boundary between the Internet 241 and an in-home LAN where the second terminal device 221 is present, and functions as a gateway/firewall/address and port number converting device.

The first terminal device 211 and the second terminal device 221 respectively run predetermined terminal programs. The terminal program realizes a communication match-up game.

In the present embodiment, the communication match-up game is progressed through following procedures.

That is, the first terminal device 211 requests an introduction of a match-up counterparty to the server device 231 which is a lobby server. Hereinafter, an IP address of the server device 231 is denoted by "S", a port number for a request for introduction is denoted by "V", and a destination of a communication is denoted by "S/V".

In a request addressed to S/V, a communication from the first terminal device 211 to the server device 231 is relayed by the first router device 212.

Consequently, the server device 231 acquires an IP address of the first router device 212 (hereinafter, "R1") as identification information on the first terminal device 211 seeking a match-up counterparty.

Likewise, when the second terminal device 221 requests an introduction of a match-up counterparty, the server device 231 acquires an IP address of the second router device 222 (hereinafter, "R2").

With respect to these two requests, both parties are introduced to each other. At this time, it is typical that the introduction is notified to a predetermined server communication port number (hereinafter, "P") of the IP address. That is, a notification for introducing R2 is made to R1/P, and a notification for introducing R1 is made to R2/P.

Because R1 and R2 are the IP addresses of the first router device 212 and the second router device 222 respectively, those are subjected to address conversion, and the notifications are relayed to the first terminal device 211 and the second terminal device 221, respectively. That is, the notification for introducing R2 reaches the port number P of the first terminal device 211, and the notification for introducing R1 reaches the port number P of the second terminal device 221. The address conversion rule for those notifications is stored as a part of respective filtering rules of the first router device 212 and the second router device 222.

In the communication match-up game, terminal devices which carry out a match-up establish a peer-to-peer communication using a preset match-up port number (hereinafter, "Q") used for a match-up communication.

The first terminal device 211 starts a communication to the preset match-up port number Q of the IP address R2, and the second terminal device 221 starts a communication to the preset match-up port number Q of the IP address R1.

The communication to R1/Q reaches the port Q of the first terminal device 211 through the address conversion by the first router device 212, and the communication to R2/Q reaches the port Q of the second terminal device 221 through the address conversion by the second router device 222.

In this manner, the peer-to-peer communication match-up is carried out through respective ports Q.

Moreover, in order to check whether the first router device 212 and the second router device 222 are respectively connected to the Internet 241, it is typical that those router devices are configured to respond to a ping/icmp protocol (the default value of a port number is 1). In this case, the value of Q can be a value other than 1.

In this case, in the second terminal device 221, the destination of packets addressed to the first terminal device 211 is R1/Q, and the destination of packets addressed to the first router device 212 is R1/1. With respect to transmission of these kinds of packets, if ACKs are returned, the communication to the first terminal device 211 and the communication addressed to the first router device 212 become successful.

Moreover, in the first terminal device 211, the destination of packets addressed to the second terminal device 221 is R2/Q, and the destination of packets addressed to the second router device 222 is R2/1. With respect to transmission of these kinds of packets, if ACKs are returned, the communication to the second terminal device 221 and the communication addressed to the second router device 222 become successful.

Note that port numbers P and Q do not always necessarily have to be constant numbers. Moreover, it is also possible to check the connection of the router device using a protocol other than the ping/icmp protocol and other port numbers. If a correspondence relationship between port numbers are used by these first terminal device 211 and the second terminal device 221 in respective in-home LANs and the port numbers used by the first router device 212 and the second router device 222 over the Internet 241 is transmitted to the server device 231 through any technique and is informed at the introductions of the first terminal device 211 and the second terminal device 221 to each other so that these devices can mutually acquire such correspondence relationship, the above-explained communications can be configured among five parties. Consequently, it should be understood that these embodiments are also included within the scope of the present invention.

Figure 3:
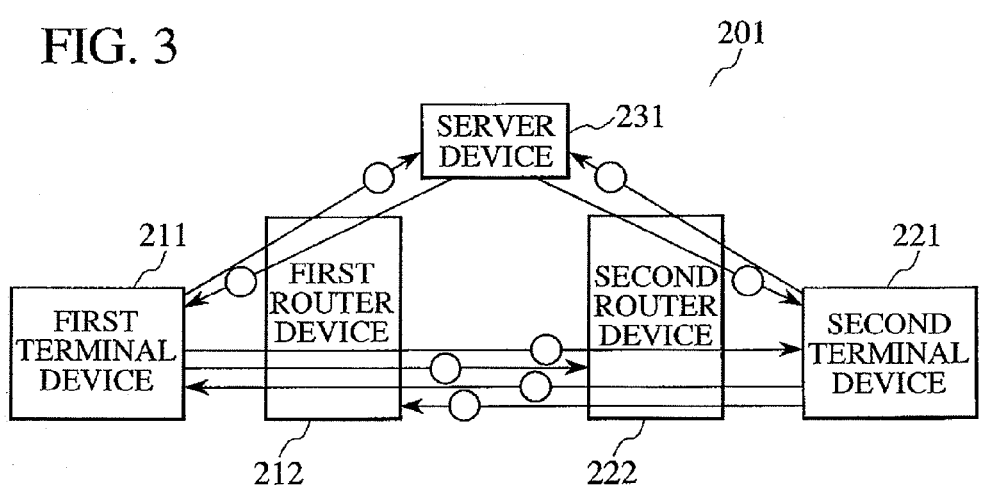
FIG. 3 is an explanatory diagram showing a condition in which a communication is normally enabled.

FIG. 3 is an explanatory diagram showing a condition in which a communication is normally enabled among the first terminal device 211, the first router device 212, the second terminal device 221, the second router device 222, and the server device 231. An explanation will now be given with reference to this diagram.

In this figure, an attempt of transmitting packets from A to B and a return of ACK from B to A, i.e., a success of a communication from A to B is indicated by an arrow with a circular mark, e.g., "A—circular mark→B".

What subjectively communicates in a communication match-up game are the first terminal device 211, the second terminal device 221, and the server device 231, and both first router device 212 and second router device 222 execute a process as being communicated by other parties, so that start points of the arrows in this figure are the first terminal device 211, the second terminal device 221, and the server device 231.

Examples of a tactic that a user of the first terminal device 211 attempts to disable a communication so as to invalidate a match-up result in the communication match-up game can be followings:

(1) Turn off the first terminal device 211.
(2) Turn off the first router device 212.
(3) Pull out a communication cable between the first terminal device 211 and the first router device 212.
(4) Pull out a communication cable between the first router device 212 and the Internet 241.
(5) Change a gateway/firewall setting of the first router device 212 temporarily, and disconnect all communications between the first router device 212 and the Internet 241.
(6) Change the gateway/firewall setting of the first router device 212 temporarily, and disconnect any communication from the second terminal device 221 to the first terminal device 211.

The technology disclosed in Patent Literature 1 and the like can cope with the tactics from (1) to (5). The present embodiment is for attempting to cope with the fraudulent action of (6).

Figure 4:
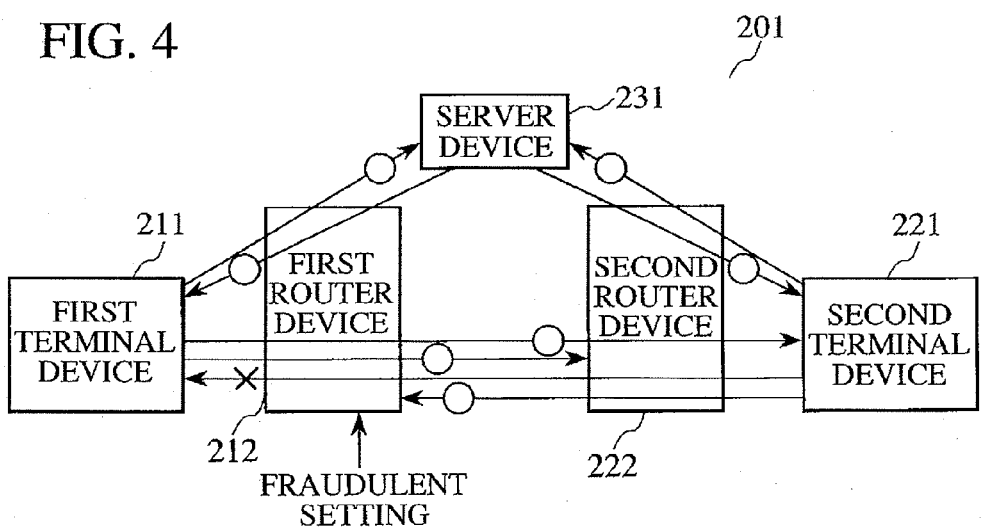
FIG. 4 is an explanatory diagram showing a condition in which a communication is partially disabled as a fraudulent setting is made.

FIG. 4 is an explanatory diagram showing a condition in which a communication is partially disabled as the foregoing fraudulent setting is made among the first terminal device 211, the first router device 212, the second terminal device 221, the second router device 222, and the sever device 231. An explanation will now be given with reference to this diagram.

Comparing this figure with the previous figure, an arrow from the second terminal device 221 to the first terminal device 211 is put with a cross mark ("←cross mark—"), but arrows other than that arrow are put with circular marks and remaining communicable. The arrangement of arrows symmetric between the first terminal device 211 and the second terminal device 221 in the previous figure becomes asymmetric in this figure. In the present embodiment, this asymmetric property is used to detect the fraudulent action of the user of the first terminal device 211.

Figure 5:
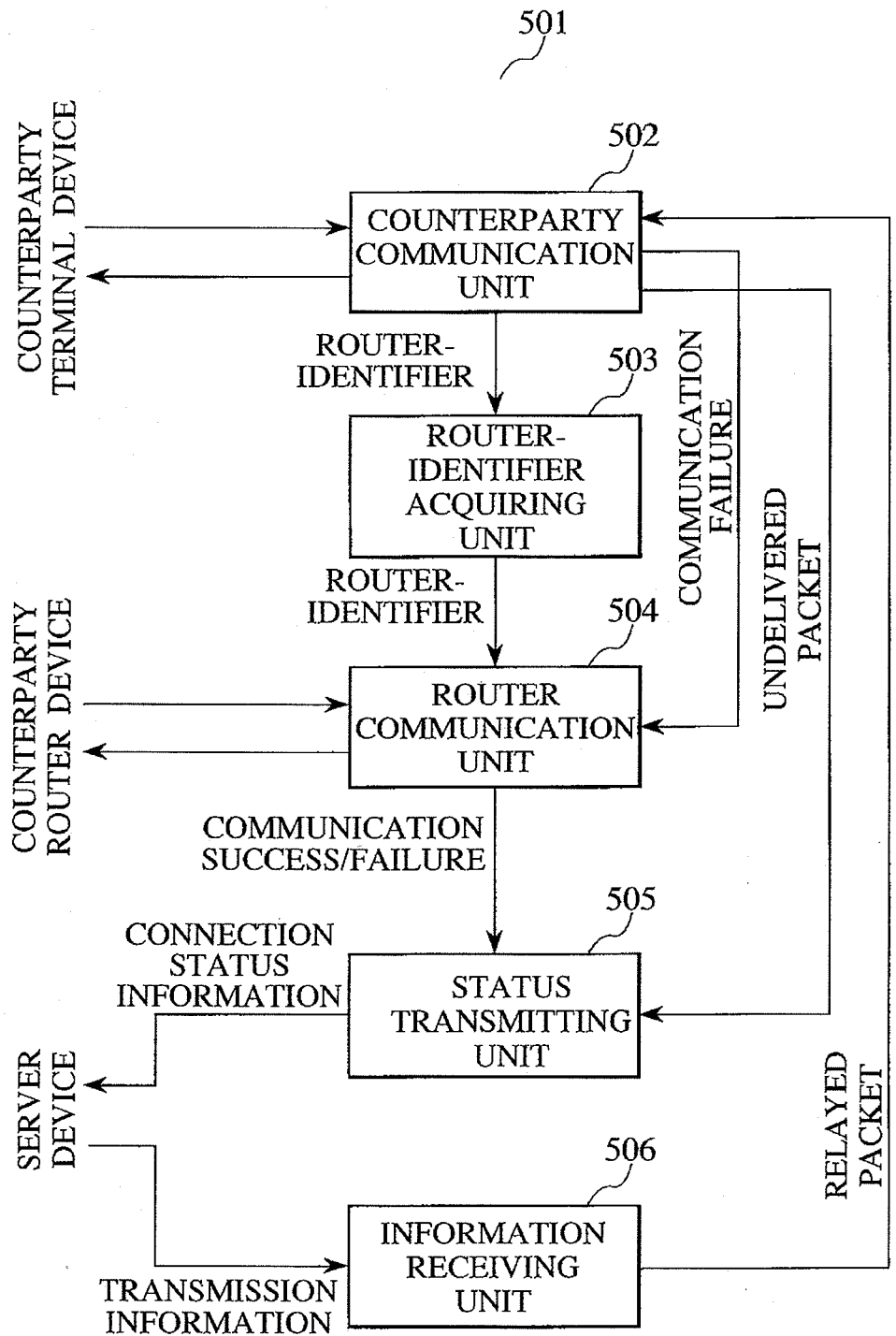
FIG. 5 is an illustrative diagram showing a general configuration of a terminal device of the embodiment.
Figure 6:
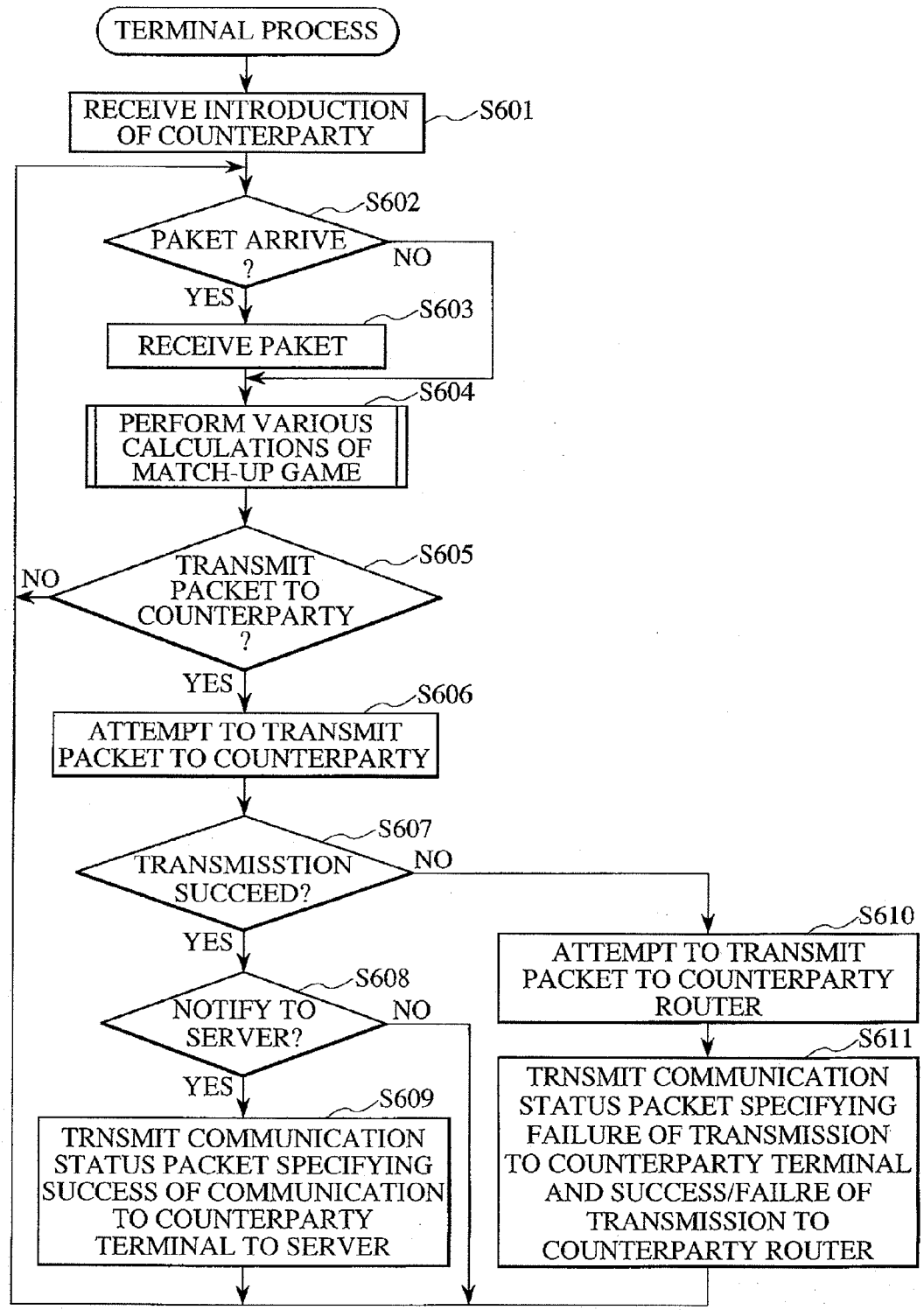
FIG. 6 is a flowchart showing a flow of a control of a terminal process executed by the terminal device.

FIG. 5 is an illustrative diagram showing a general configuration of a terminal device which functions as the first terminal device 211 or the second terminal device 221 of the present embodiment. FIG. 6 is a flowchart showing a flow of a control of a terminal process executed by the terminal device. An explanation will now be given with reference to these diagrams.

A terminal device 501 has a counterparty communication unit 502, a router-identifier acquiring unit 503, a router communication unit 504, a status transmitting unit 505, and an information receiving unit 506.

As the terminal process starts, as explained above, the terminal device 501 accesses the server device 231 which functions as a lobby server to receive an introduction of an IP address and that of a port number which are laid open to the public by a communication counterparty over the Internet, and causes the counterparty communication unit 502 to perform an initial setting for a peer-to-peer communication (step S601). When the terminal device 501 of the counterparty is directly connected to the Internet 241, the IP address and the port number acquired at this step are directly used by the terminal device 501 of the counterparty.

However, the terminal device 501 of the counterparty is often connected to the Internet 241 via a router device. Consequently, the IP address is the IP address of the router device used by the terminal device 501 of the counterparty, and in the router device of the counterparty, when packets arrive at the port number acquired in the step S601, these packets are relayed to the terminal device 501 of the counterparty.

The IP address and the port number acquired at this step are temporarily stored in the RAM 103 or the like. Consequently, the CPU 101 works together with the NIC 109 and the RAM 103 to function as the router-identifier acquiring unit 503.

Thereafter, when packets have already arrived from the terminal device 501 of the counterparty or from the server device 231 (step S602; Yes), the terminal device 501 receives the packets (step S603), and when no packets have arrived yet (step S602; No), the terminal device 501 performs a calculation process of a communication match-up game (step S604). With respect to content of the calculation process of the communication match-up game, various game technologies can be directly applied.

In most cases, while the communication match-up is continuing, packets are being exchanged between the terminal device 501 and the terminal device 501 of the counterparty, and when the communication match-up ends and it becomes a stage of informing a match-up result, packets are exchanged between the terminal device 501 and the server device 231. Consequently, in such case, the CPU 101 works together with the NIC 109 and the RAM 103 to function as the counterparty communication unit 502.

Moreover, as will be discussed later, a calculation process of proceeding the match-up of the communication match-up game is also performed with packets which are relayed by the server device 231 being as packets which directly arrived from the terminal device 501 of the counterparty. In this case, the CPU 101 works together with the NIC 109 and the RAM 103 to function as the information receiving unit 506.

Thereafter, when it becomes a condition in which packets are to be transmitted to the counterparty through the calculation process of the communication match-up game (step S605; counterparty), the counterparty communication unit 502 attempts to transmit the packets to the IP address and the port number introduced in the step S601 (step S606). In this case, the CPU 101 also works together with the NIC 109 and the RAM 103 to function as the counterparty communication unit 502.

When an ACK is returned before a time out occurs relative to the transmission of the packets and the transmission becomes successful (step S607;Yes), it is determined whether to make a notification of success to the server device 231 (step S608). It is typical that the number of notifications to the server device 231 is reduced as needed and the reduced number of notifications is made at regular time intervals, or when, for example, the communication match-up ends, in addition to a case in which a fixed number of packets are transmitted. However, when a status of the match-up of both parties is broadcasted to other terminal devices 501 over the Internet 241, it is typical to make a notification of such status to the server device 231 together with information indicating a status of the communication match-up game every time the transmission becomes successful.

When it is determined to make the notification (step S608; Yes), connection status packets specifying a success of a communication to the counterparty are transmitted to the server device 231 (step S609), and the process returns to the step S602, and if it is determined not to make the notification (step S608; No), the process directly returns to the step S602.

Conversely, when a time out occurs in a communication to the counterparty and the transmission has failed (step S607; No), the transmission of the packets to a ping/icmp protocol port of the IP address introduced in the step S601 is attempted based on that protocol to check whether a communication to the router device of the counterparty is possible (step S610).

When the router device of the counterparty receives the inquiry of ping/icmp, the router device of the counterparty returns an ACK or acknowledgment packets without causing packets to flow in a LAN. Consequently, even if the foregoing fraudulent setting like (6) is made, the ACK and the acknowledgment packets from the router device of the counterparty should be acquired.

Thereafter, connection information packets specifying:

(1) A result of whether the transmission of the packets was successful, and (2) Contents of undelivered packets which were failed to be transmitted in the steps S606 and S607, as transmission information are generated and transmitted to the server device 231 (step S611), and the process returns to the step S602.

Note that whether the transmission of the packets was successful in the step S610 indicates whether communication to the router device of the counterparty was successful. Moreover, if the undelivered packets are contained in the connection status packets generated in the step S611, the communication to the counterparty terminal device 501 fails. Consequently, it is not necessary to explicitly specify the failure of the communication to the counterparty terminal device 501 in the connection information packets.

Moreover, contents of packets which were failed to be transmitted are transmitted to the server device 231 so as to inform the contents of the packets to the counterparty terminal device 501 through the server device 231. Accordingly, it becomes possible to cope with a temporary network malfunction or to make a fraudulent action by the counterparty actually meaningless.

Consequently, the CPU 101 works together with the RAM 103 and the NIC 109 to function as the status transmitting unit 505.

Connection status information specifying whether a communication from the counterparty communication unit 502 to the communication counterparty is successful and whether a communication from the router communication unit 504 to the router device to which the communication counterparty is connected is successful is transmitted to the server device at a predetermined timing.

When the communication to the communication counterparty is successful, the communication to the router device of the communication counterparty is deservingly successful, so that specification of whether communication by the router communication unit 504 is successful in the connection status information may be limited to a case in which the communication to the communication counterparty has failed. Note that typical examples of the predetermined timing are: at regular time intervals, when the communication with the communication counterparty has failed, when a match-up with the communication counterparty ends and a match-up result is to be informed, or any combination of these.

In this manner, the terminal device 501 carries out the communication match-up game, while the server device 231 executes a process of checking the contents of the connection status packets transmitted from the terminal devices 501 (the first terminal device 211, the second terminal device 221) and of determining whether a fraudulent action is caused.

Figure 7:
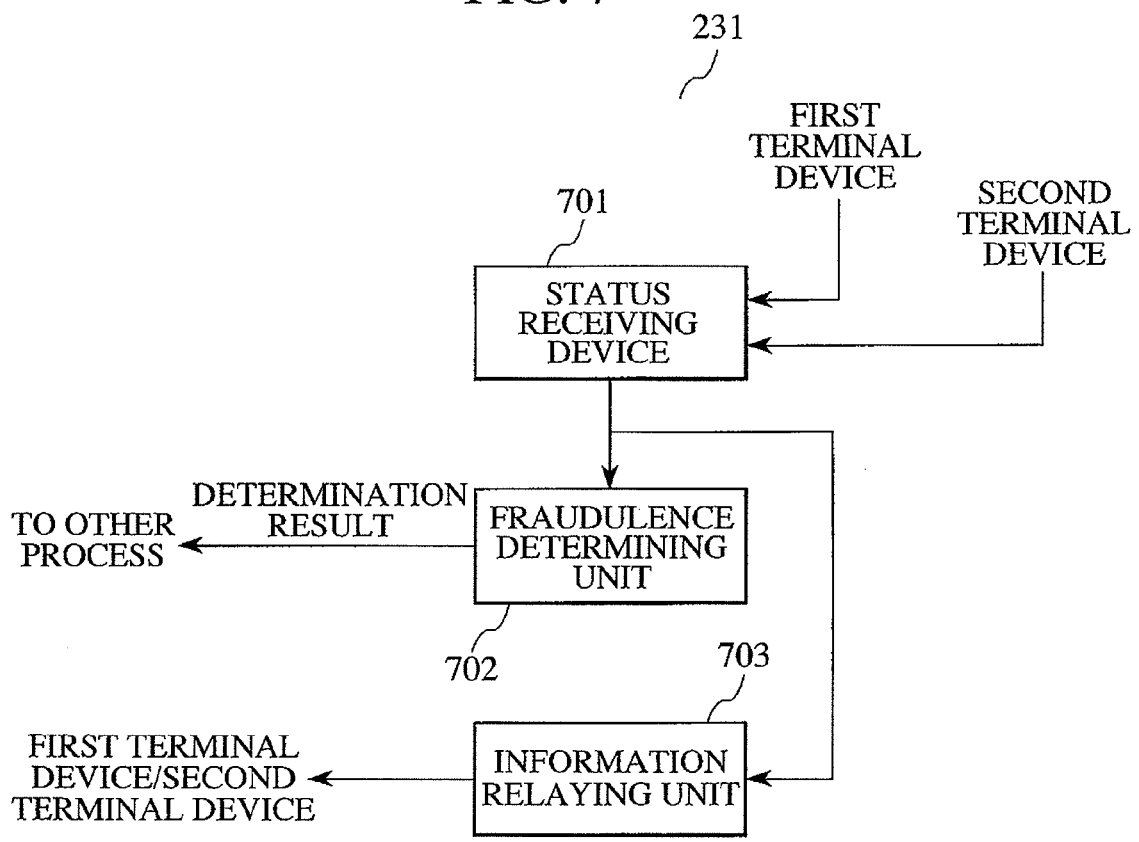
FIG. 7 is an illustrative diagram showing a general configuration of a server device.
Figure 8:
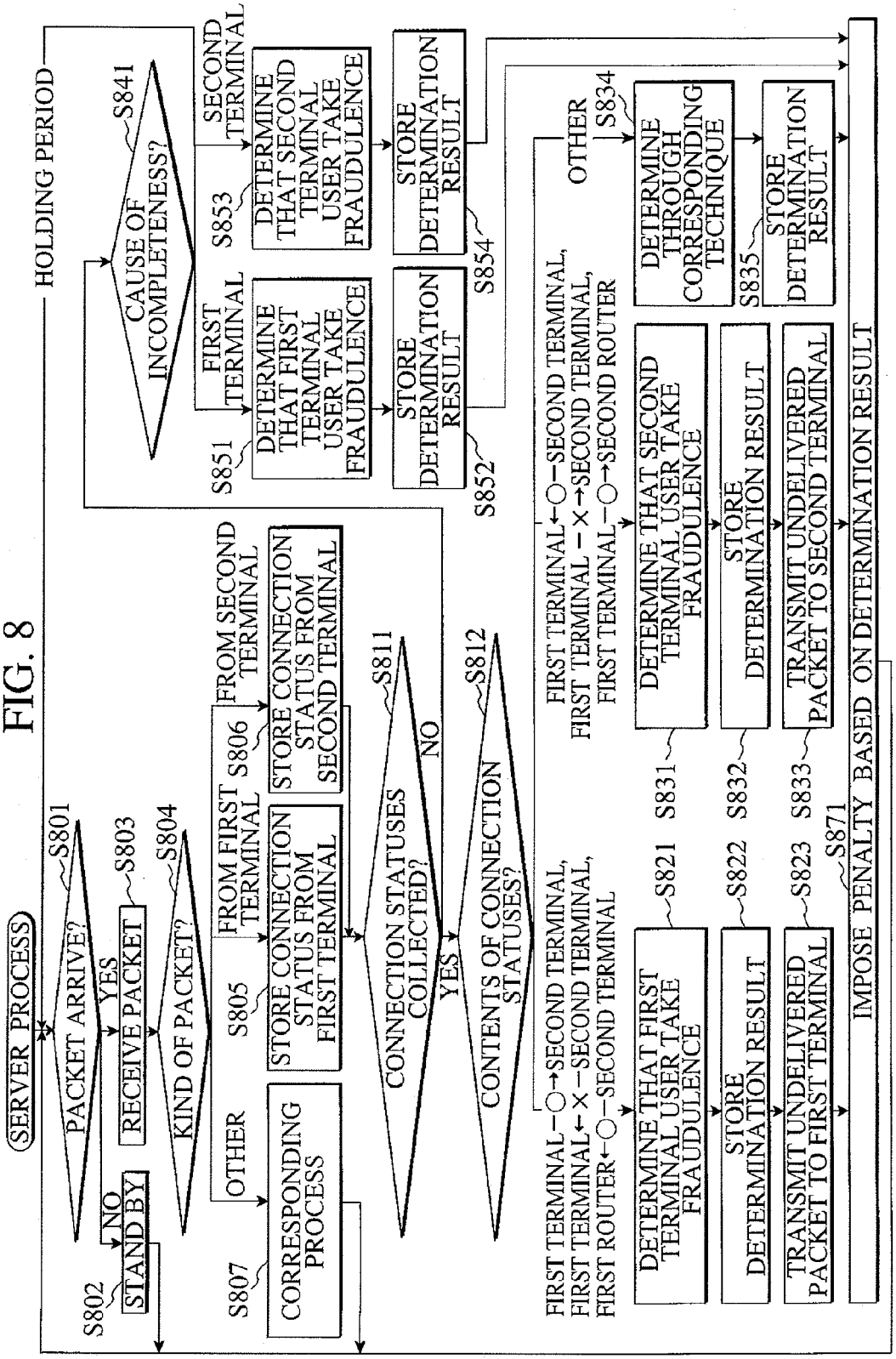
FIG. 8 is a flowchart showing a flow of a control of a service process executed by the server device.

FIG. 7 is an illustrative diagram showing a general configuration of the server device 231, and FIG. 8 is a flowchart showing a flow of a control of a service process executed by the server device 231. An explanation will now be given with reference to these diagrams. Note that for ease of understanding, the explanation will be given in focusing of a process of the connection status packets. Various kinds of conventionally-well-known techniques can be applied to such functions, such as, for example, a lobby server, of introducing a match-up counterparty, and of accumulating mach-up results to create a ranking.

The server device 231 has a status receiving unit 701, a fraudulence determining unit 702 and an information relaying unit 703.

As the present service process starts, the CPU 101 of the server device 231 monitors the NIC 109 to check whether packets have arrived from various external devices, e.g., the first terminal device 211, and the second terminal device 221 (step S801), and when such packets have not arrived yet (step S801; No), the CPU 101 stands by for a certain time, or executes other processes in a co-routine manner as needed (step S802), and returns the process to the step S801.

Conversely, when the packets have already arrived (step S801; Yes), the packets are received (step S803). Thereafter, the category of the packets are checked (step S804), and when those packets are connection status packets transmitted from the first terminal device 211 (step S804; from the first terminal), such packets are stored in the RAM 103 as latest connection status packets from the first terminal device 211 (step S805), and the process progresses to a step S811.

When those packets are connection status packets transmitted from the second terminal device 221 (step S804; from the second terminal), those packets are stored in the RAM 103 as latest connection status packets from the second terminal device 221 (step S806), and the process progresses to the step S811.

When those packets are other kinds of packets (step S804; other), a process corresponding to those packets is executed (step S807), and the process returns to the step S801. The process executed in this step includes a process as a lobby server, etc.

When the latest connection status packets from the first terminal device 211 and the latest connection status packets from the second terminal device 221 are collected (step S811; Yes), these connection status packets are examined (step S812).

Note that with respect to a process in this step, the connection status packets from both terminal devices may be associated one by one and may be examined in order of arrival, but it is typical that a past connection status packet is discarded every time a new connection status packet arrives and a latest connection status packet is referred, and a connection status packet subjected to determination in a following determination process is discarded and a next determination is carried out when connection status packets from both parties are collected for the first time after the determination is made.

That is, when it is specified that a communication from the first terminal device 221 to the second terminal device 221 is successful, a communication from the second terminal device 221 to the first terminal device 211 has failed, and a communication from the second terminal device 221 to the first router device 212 is successful (step S812; the first terminal—circular mark→the second terminal, the first terminal←cross mark—second terminal, the first router←circular mark—the second terminal), a determination that a user of the first terminal device 211 took a fraudulent action is made (step S821), and such determination result is recorded in the RAM 103 (step S822).

Thereafter, the CPU 101 transmits the undelivered packets specified in the connection status packets from the second terminal device 221 to the first terminal device 211 via the NIC 109 (step S823), and progresses the process to a step S871.

Conversely, when a communication from the second terminal device 221 to the first terminal device 211 is successful, a communication from the first terminal device 211 to the second terminal device 221 has failed, and a communication from the first terminal device 211 to the second router device 222 is successful (step S812; the first terminal←circular mark—the second terminal, the first terminal—cross mark→second terminal, the first terminal—circular mark→the second router), it is determined that a user of the second terminal device 221 took a fraudulent action (step S831), and such determination result is recorded in the RAM 103 (step S832).

Thereafter, the CPU 101 transmits the undelivered packets specified in the connection status packets from the first terminal device 211 to the second terminal device 221 via the NIC 109 (step S833), and progresses the process to the step S871.

Consequently, as the server device 231 relays the undelivered packets in step S823 and the step S833, respectively, the CPU 101 works together with the NIC 109 to function as the information relaying unit 703.

When other connection statuses are found (step S812; other), using the determination criterion disclosed in, for example, Patent Literature 1, the party of the cause of a fraudulent action is determined (step S834), a result of such determination is recorded in the RAM 103 (step S835), and the process progresses to the step S871.

Conversely, when the latest connection status packets from the first terminal device 211 and the latest connection status packets from the second terminal device 221 are not collected (step S811; No), the cause of the incompleteness is ascertained. That is, when connection status packets have not arrived from the first terminal device 211 for a certain period (step S841; the first terminal), it is determined that the user of the first terminal device 211 took a fraudulent action (step S851), such determination result is recorded in the RAM 103 (step S852), and the process progresses to the step S871.

If connection status packets do not arrive from the second terminal device 221 for a certain period (step S841; the second terminal), it is determined that the user of the second terminal device 221 took a fraudulent action (step S853), such determination result is recorded in the RAM 103 (step S854), and the process progresses to the step S871.

Moreover, if certain periods for the first terminal device 211 and the second terminal device 221 have not elapsed after the connection status packets are finally received (step S841; a holding period) the process returns to the step S801.

After the fraudulent action is detected, such calculation processes of game achievements, such as, imposing a penalty on the achievement of the user who took the fraudulent action, are recorded in the RAM 103 is executed (step S871), and the process returns to the step S801.

Note that when the communication performance and the processing performance of the server device 231 are limited, the relaying process of the undelivered packets may be omitted accordingly.

Through the foregoing processes, even if a fraudulent action is taken by temporarily disconnecting the inflow of packets from a match-up counterparty, the fraudulent action can be detected and a penalty may be imposed. In addition, even if such fraudulent action is taken, the fraudulent action itself becomes meaningless as undelivered packets are relayed by a server, resulting in contribution to the maintenance of a fair communication match-up environment.

This application claims the benefit of Japanese Patent Application No. 2008-034497 (filed on Feb. 15, 2008), and as far as respective laws of designated nations permit, the entire disclosure of which is herein incorporated by reference.

INDUSTRIAL APPLICABILITY

As explained above, according to the present invention, it becomes possible to provide a communication system and a communication method suitable for detecting a fraudulent action such that a user using a router device attempts to invalidate a result of a communication match-up by changing the setting of the router device in a match-up game through a communication, a computer-readable information recording medium recording a program which realizes those system and method on a computer, and the program.

The invention claimed is:

1. A communication system comprising:
a first terminal device which is connected to a computer communication network through a first router device;
a second terminal device which is connected to the computer communication network through a second router device; and
a server device which is connected to the computer communication network, the first terminal device and the second terminal device communicating with each other as respective communication counterparties through the first router device, the computer communication network, and the second router device, wherein
(a) the first terminal device and the second terminal device each includes
a counterparty communication unit which communicates with the communication counterparty through the router device to which the local terminal device is connected;
a router-identifier acquiring unit which acquires a communication identifier of the router device to which the communication counterparty is connected when a communication from the counterparty communication unit to the local communication counterparty succeeds;
a router communication unit which communicates with the router device having the acquired communication identifier when a communication from the counterparty communication unit to the communication counterparty succeeds but then failed; and
a status transmitting unit which transmits, at a predetermined timing, connection status information specifying whether communication from the counterparty communication unit to the communication counterparty is successful and whether communication from the router communication unit to the router device to which the communication counterparty is connected is successful to the server device, and (b) the server device includes:

a status receiving unit which receives the connection status information transmitted from the first terminal device and the connection status information transmitted from the second terminal device; and a fraudulence determining unit which determines, based on the connection status information received from the first terminal device and the connection status information received from the second terminal device, (1) that a user of the first terminal device has taken a fraudulent action when it is specified that all of the following has occurred:

(a) a communication from the first terminal device to the second terminal device is successful, and (b) a communication from the second terminal device to the first terminal device has failed, and (c) a communication from the second terminal device to the first router device is successful, the fraudulent action taken by the user of the first terminal being changing a firewall/gateway setting of the first router, and (2) that a user of the second terminal device has taken a fraudulent action when it is specified that all of the following has occurred:

(a) a communication from the second terminal device to the first terminal device is successful, and (b) a communication from the first terminal device to the second terminal device has failed, and (c) a communication from the first terminal device to the second router device is successful, the fraudulent action taken by the user of the second terminal being changing a firewall/gateway setting of the second router.

2. The communication system according to claim 1, wherein the fraudulence determining unit determines (3) that the user of the first terminal device takes a fraudulent action when the connection status information to be transmitted from the first terminal device is not received for a predetermined period, and the connection status information to be transmitted from the second terminal device is received during the predetermined period, and (4) that the user of the second terminal device takes a fraudulent action when the connection status information to be transmitted from the second terminal device is not received for the predetermined period, and the connection status information to be transmitted from the first terminal device is received during the predetermined period.

3. The communication system according to claim 1 or 2, wherein (c) at the first terminal device and at the second terminal device, when a communication with the communication counterparty through the counterparty communication unit has failed, and a communication with the router device to which the communication counterparty is connected through the router communication unit is successful, the status transmitting unit specifies transmission information to the effect that the counterparty communication unit fails in transmission to the communication counterparty, in addition to the effect that the communication with the communication counterparty through the counterparty communication unit has failed and the communication with the router device to which the communication counterparty is connected through the router communication unit is successful in the connection status information and transmits the connection status information to the server device, and (d) the server device further includes an information relaying unit which transmits the transmission information specified in the connection status information from the second terminal device to the first terminal device when a condition (1) is satisfied, and transmits the transmission information specified in the connection status information from the first terminal device to the second terminal device when a condition (2) is satisfied, and relays the transmission information, (e) the first terminal device and the second terminal device each further includes an information receiving unit which receives the transmission information transmitted from the server device, and the counterparty communication unit treats the transmission information received by the information receiving unit as being transmitted from the communication counterparty.

4. A communication method executed by a first terminal device which is connected to a computer communication network through a first router device, a second terminal device which is connected to the computer communication network through a second router device, and a server device which is connected to the computer communication network, the first terminal device and the second terminal device communicating with each other as a communication counterparty through the first router device, the computer communication network, and the second router device, wherein (a) the first terminal device and the second terminal device each includes a counterparty communication unit, a router-identifier acquiring unit, a router communication unit, and a status transmitting unit, the communication method comprises:

a counterparty communication step in which the counterparty communication unit communicates with the communication counterparty through the router device to which the local terminal device is connected;

a router-identifier acquisition step in which the router-identifier acquiring unit acquires a communication identifier of the router device to which the communication counterparty is connected when a communication to the communication counterparty succeeds in the counterparty communication step;

a router communication step in which the router communication unit communicates with the router device having the acquired communication identifier when a communication to the communication counterparty succeeds but then failed in the counterparty communication step; and a status transmission step of transmitting, to the server device at a predetermined timing, connection status information specifying whether communication to the communication counterparty is successful in the counterparty communication step and whether communication to the router device to which the communication counterparty is connected is successful in the router communication step, (b) the server device includes a status receiving unit and a fraudulence determining unit, and the communication method further comprises:

a status reception step in which the status receiving unit receives the connection status information transmitted from the first terminal device and the connection status information transmitted from the second terminal device; and a fraudulence determination step in which the fraudulence determining unit determines, based on the connection status information received from the first terminal device and the connection status information received from the second terminal device,
(1) that a user of the first terminal device has taken a fraudulent action when it is specified that all of the following has occurred:
(a) a communication from the first terminal device to the second terminal device is successful,
(b) a communication from the second terminal device to the first terminal device has failed, and
(c) a communication from the second terminal device to the first router device is successful, the fraudulent action taken by the user of the first terminal being changing a firewall/gateway setting of the first router, and
(2) that a user of the second terminal device has taken a fraudulent action when it is specified that all of the following has occurred:
(a) a communication from the second terminal device to the first terminal device is successful,
(b) a communication from the first terminal device to the second terminal device has failed, and
(c) a communication from the first terminal device to the second router device is successful, the fraudulent action taken by the user of the second terminal being changing a firewall/gateway setting of the second router.

5. A non-transitory computer-readable information recording medium recording a terminal program which causes a first terminal computer that is connected to a computer communication network through a first router device to function as a first terminal device, and causes a second terminal computer that is connected to the computer communication network through a second router device to function as a second terminal device, and a server program which causes a server computer that is connected to the computer communication network to function as a server device, the terminal program causing the first terminal device and the second terminal device to function so as to communicate with each other as respective communication counterparties through the first router device, the computer communication network, and the second router device, wherein (a) the terminal program causes each of the first terminal computer and the second terminal computer to function as:
a counterparty communication unit which communicates with the communication counterparty through the router device to which the local terminal device is connected;
a router-identifier acquiring unit that acquires a communication identifier of the router device to which the communication counterparty is connected when a communication from the counterparty communication unit to the local communication counterparty succeeds;
a router communication unit which communicates with the router device having the acquired communication identifier when a communication from the counterparty communication unit to the communication counterparty succeeds but then failed; and
a status transmitting unit which transmits, at a predetermined timing, connection status information specifying whether communication from the counterparty communication unit to the communication counterparty is successful and whether communication from the router communication unit to the router device to which the communication counterparty is connected is successful to the server computer, and
(b) the sever program causes the server computer to function as: a status receiving unit which receives the connection status information transmitted from the first terminal computer and the connection status information transmitted from the second terminal computer; and
a fraudulence determining unit which determines, based on the connection status information received from the first terminal computer and the connection status information received from the second terminal computer,
(1) that a user of the first terminal computer has taken a fraudulent action when it is specified that all of the following has occurred:
(a) a communication from the first terminal computer to the second terminal computer is successful, (b) a communication from the second terminal computer to the first terminal computer has failed, and
(c) a communication from the second terminal computer to the first router device is successful, the fraudulent action taken by the user of the first terminal being changing a firewall/gateway setting of the first router, and
(2) that a user of the second terminal computer has taken a fraudulent action when it is specified that all of the following has occurred:
(a) a communication from the second terminal computer to the first terminal computer is successful, and
(b) a communication from the first terminal computer to the second terminal computer has failed, and
(c) a communication from the first terminal computer to the second router device is successful, the fraudulent action taken by the user of the second terminal being changing a firewall/gateway setting of the second router.

6. A program, stored on a non-transitory computer-readable information recording medium, including a terminal program which causes a first terminal computer that is connected to a computer communication network through a first router device to function as a first terminal device, and causes a second terminal computer that is connected to the computer communication network through a second router device to function as a second terminal device, and a server program which causes a server computer that is connected to the computer communication network to function as a server device, the terminal program causing the first terminal device and the second terminal device to function so as to communicate with each other as respective communication counterparties through the first router device, the computer communication network, and the second router device, wherein
(a) the terminal program causes each of the first terminal computer and the second terminal computer to function as:
a counterparty communication unit which communicates with the communication counterparty through the router device to which the local terminal device is connected;
a router-identifier acquiring unit that acquires a communication identifier of the router device to which the communication counterparty is connected when a communication from the counterparty communication unit to the local communication counterparty succeeds;
a router communication unit which communicates with the router device having the acquired communication identifier when a communication from the counterparty communication unit to the communication counterparty succeeds but then failed; and
a status transmitting unit which transmits, at a predetermined timing, connection status information specifying whether communication from the counterparty communication unit to the communication counterparty is successful and whether communication from the router communication unit to the router device to which the communication counterparty is connected is successful to the server computer, and (b) the server program causes the server computer to function as:

a status receiving unit which receives the connection status information transmitted from the first terminal computer and the connection status information transmitted from the second terminal computer; and a fraudulence determining unit which determines, based on the connection status information received from the first terminal computer and the connection status information received from the second terminal computer, a fraudulence determining unit which determines, based on the connection status information received from the first terminal computer and the connection status information received from the second terminal computer, (1) that a user of the first terminal computer has taken a fraudulent action when it is specified that all of the following has occurred:

(a) a communication from the first terminal computer to the second terminal computer is successful, (b) a communication from the second terminal computer to the first terminal computer has failed, and (c) a communication from the second terminal computer to the first router device is successful, the fraudulent action taken by the user of the first terminal being changing a firewall/gateway setting of the first router, and (2) that a user of the second terminal computer has taken a fraudulent action when it is specified that all of the following has occurred:

(a) a communication from the second terminal computer to the first terminal computer is successful, and (b) a communication from the first terminal computer to the second terminal computer has failed, and (c) a communication from the first terminal computer to the second router device is successful, the fraudulent action taken by the user of the second terminal being changing a firewall/gateway setting of the second router.

* * * * *